Jan. 1, 1924 1,479,331
H. M. STEPHENSON
NONREWIND REEL FOR MOTION PICTURE FILMS
Original Filed Aug. 28, 1919 5 Sheets-Sheet 3
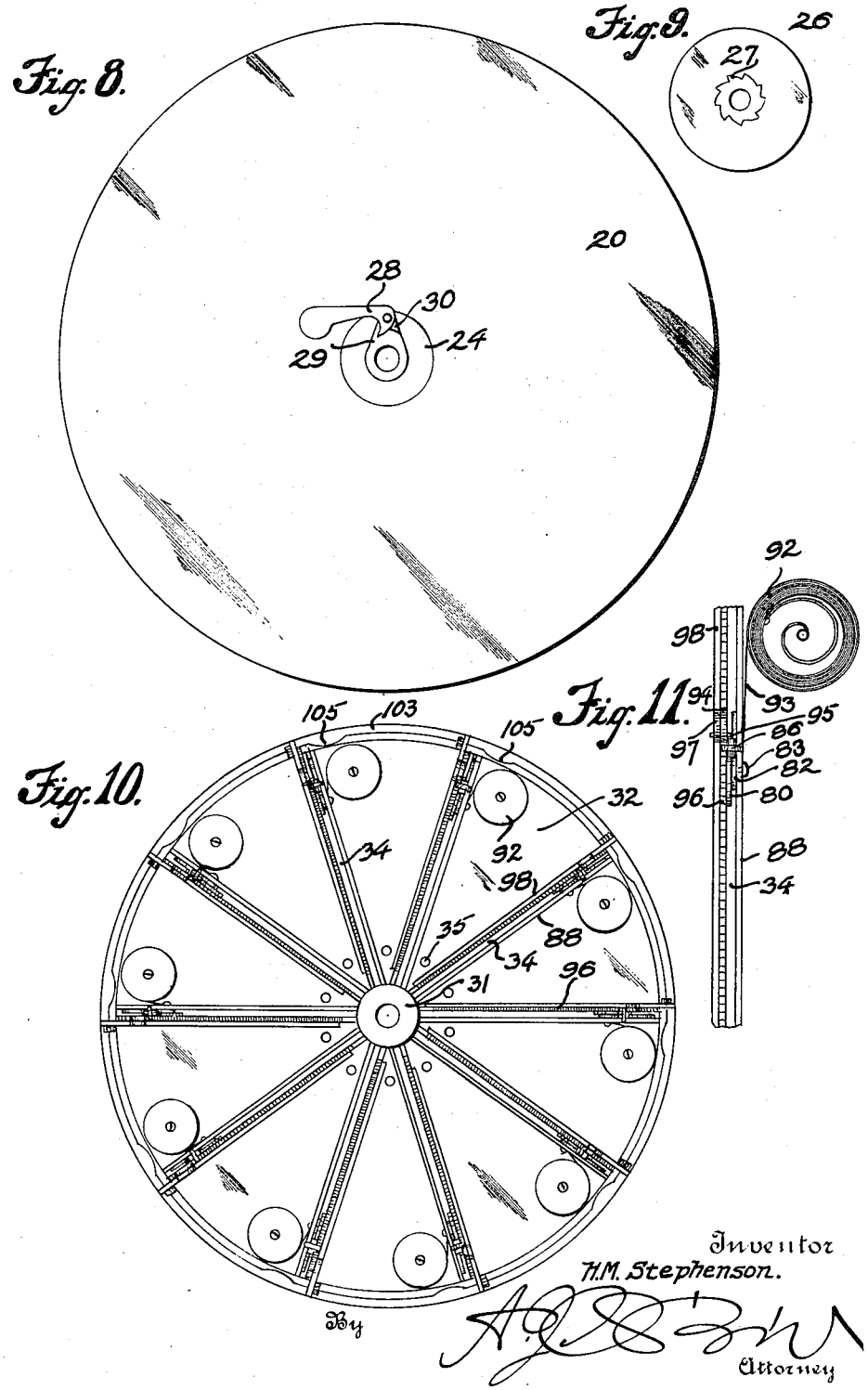

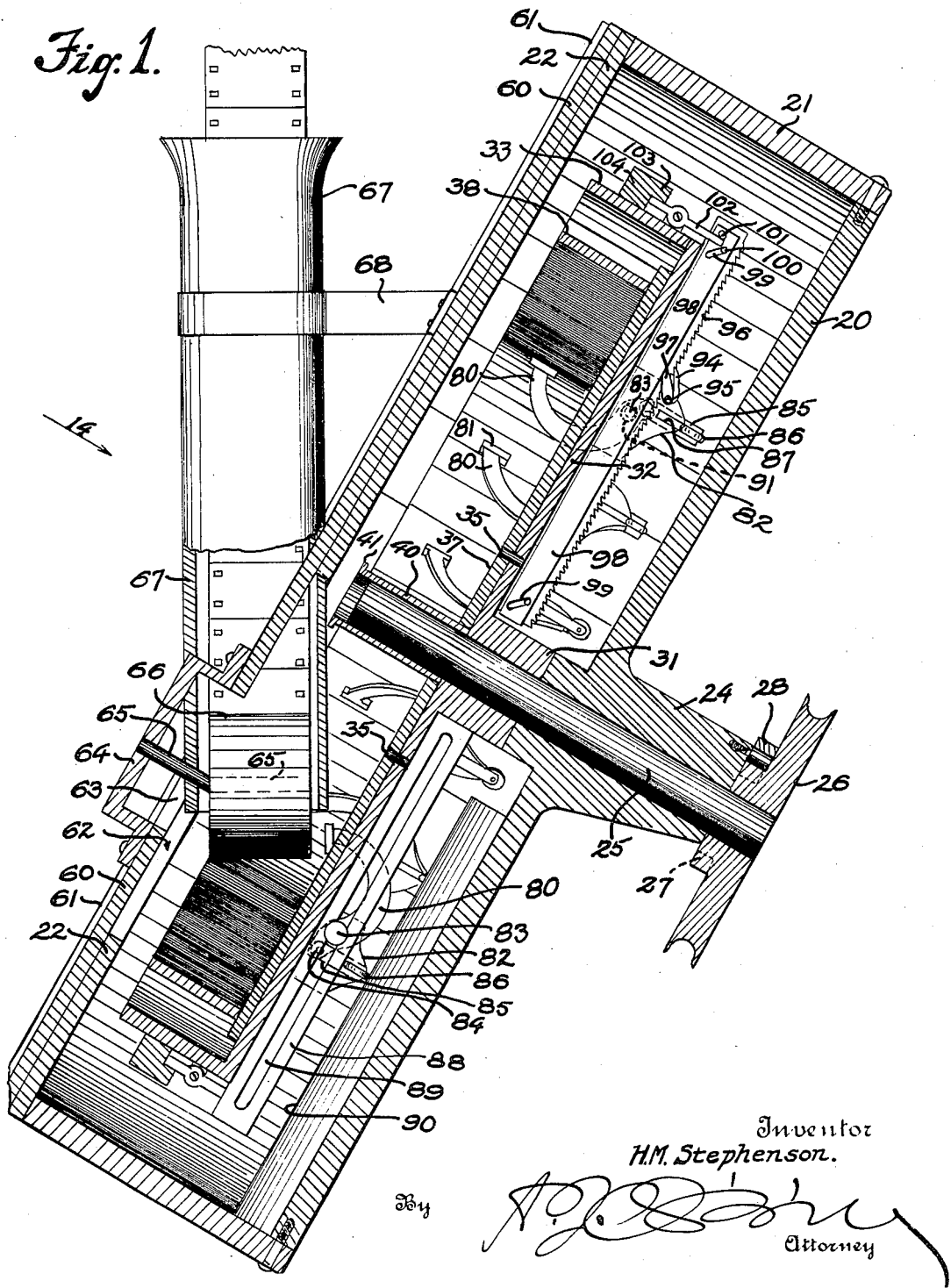

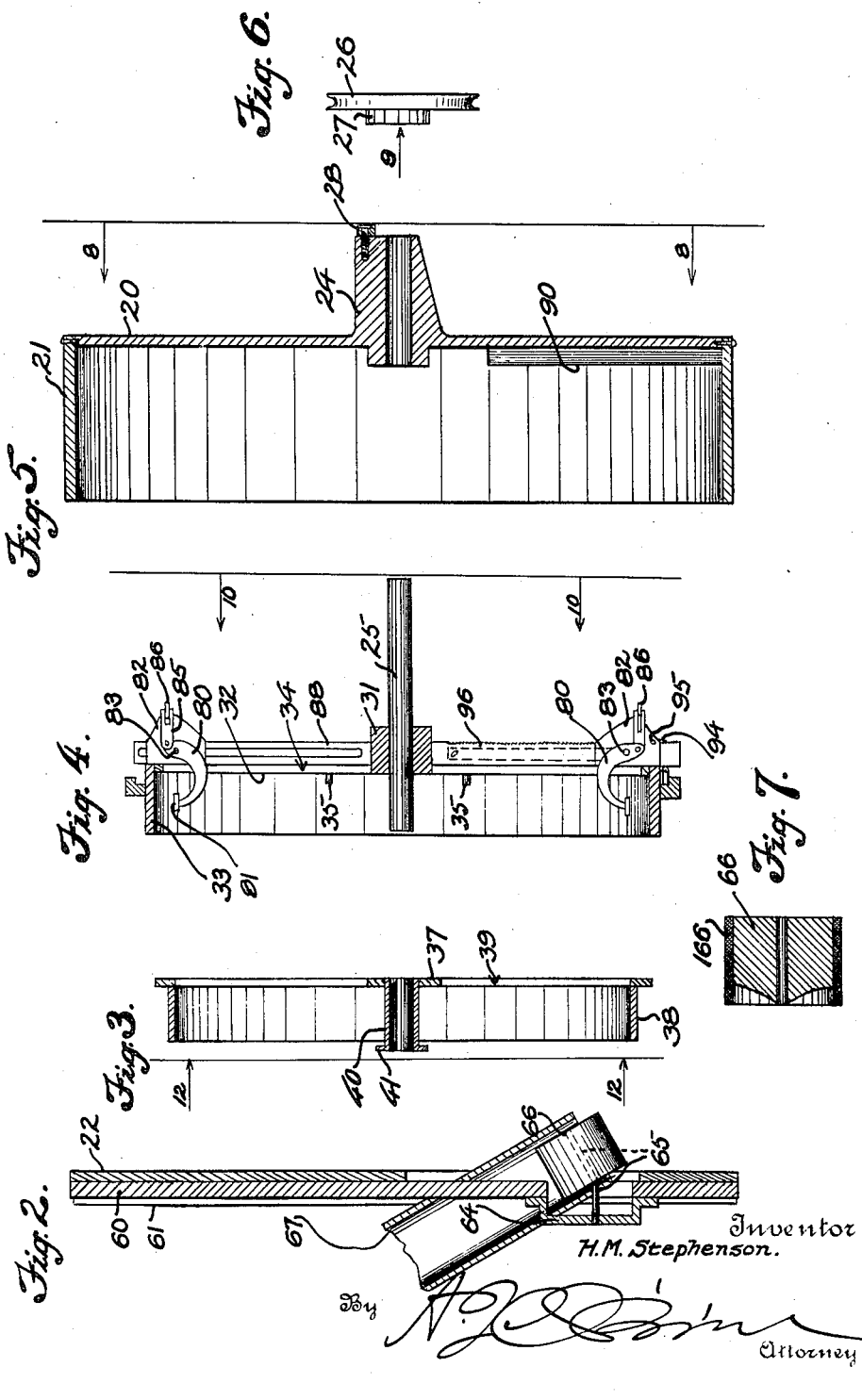

Jan. 1, 1924.
H. M. STEPHENSON
1,479,331
NONREWIND REEL FOR MOTION PICTURE FILMS
Original Filed Aug. 28, 1919    5 Sheets-Sheet 4
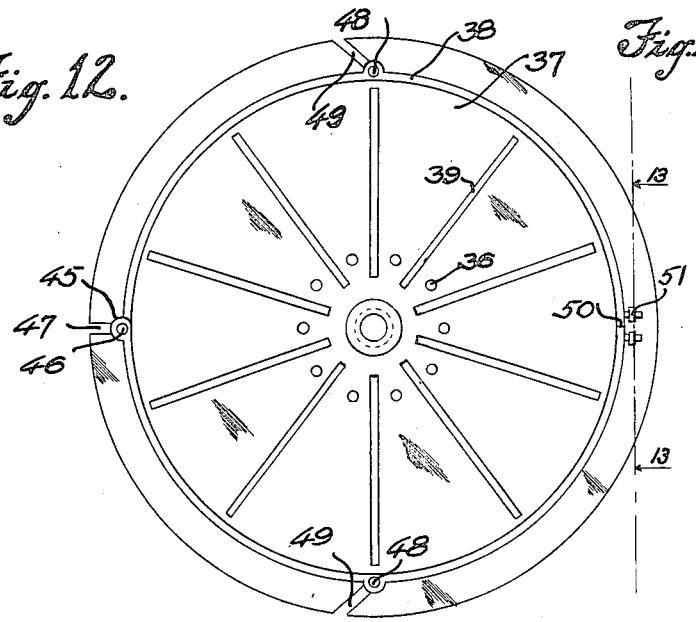
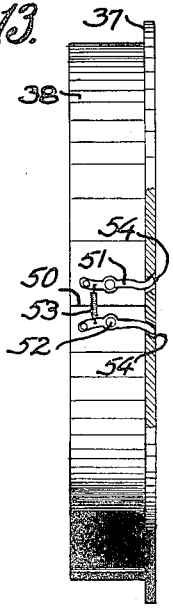
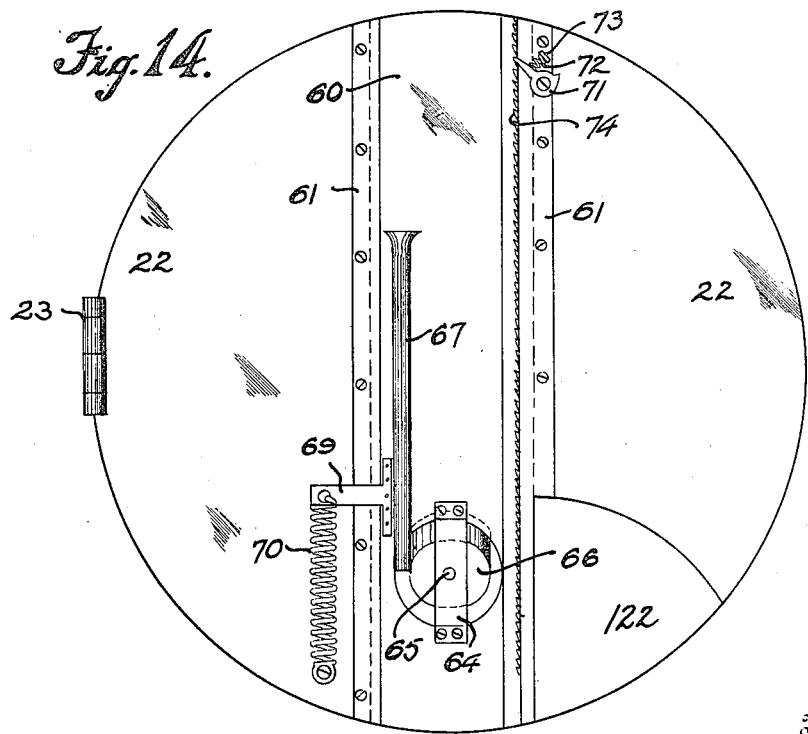
Inventor
H. M. Stephenson.
By 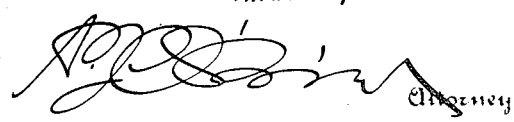
Attorney

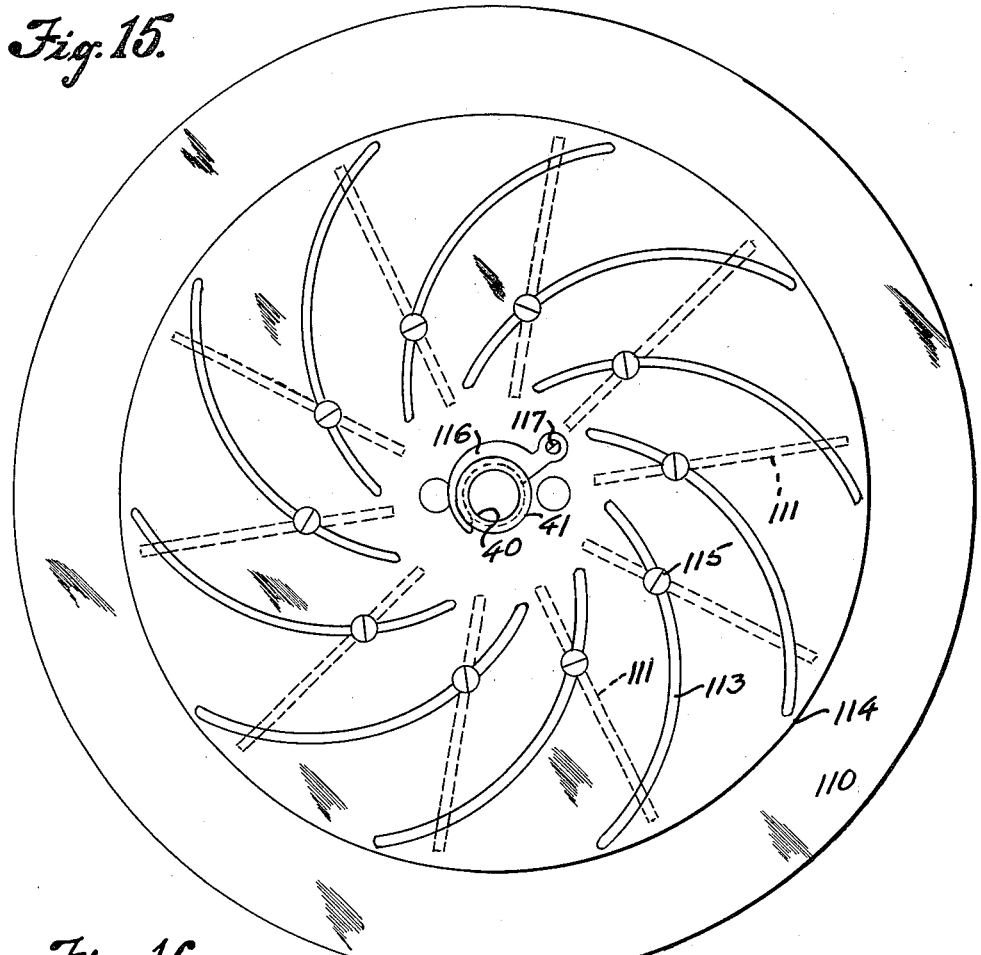
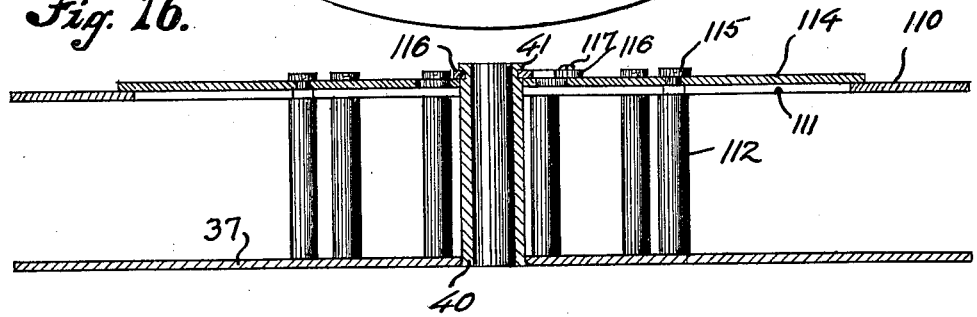

Patented Jan. 1, 1924.                                                                    1,479,331

UNITED STATES PATENT OFFICE.

HARRY M. STEPHENSON, OF DENVER, COLORADO.

NONREWIND REEL FOR MOTION-PICTURE FILMS.

Application filed August 28, 1919, Serial No. 320,380. Renewed August 11, 1922. Serial No. 581,261.

*To all whom it may concern:*

Be it known that I, HARRY M. STEPHENSON, a citizen of the United States, residing at the city and county of Denver and State of Colorado, have invented certain new and useful Improvements in Nonrewind Reels for Motion-Picture Films; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to avoid rewinding films from a reel on which they have been wound as they left the motion picture machine prior to running the film through the machine again.

Heretofore it has been customary to wind motion picture films onto an ordinary reel after they have been shown, and then rewind in order to bring the beginning of the film outermost on the reel. This extra winding is eliminated by the present device, the film being wound internally upon the interior of the reel.

Briefly, the invention comprises a casing within which there is mounted a carrier, the carrier having a shaft fixed thereon projecting through the casing and carrying a pulley to drive the carrier. An internal reel is mounted upon the carrier and driven thereby. The casing has a door upon which a slide is provided, the slide carrying at an angle a film guide and a small roller, which is adapted to rest upon the wound portion of the film and guide the incoming portion as it is internally wound. The carrier and the reel are both slotted, the slots receiving arms carrying pressure pads adapted to engage and hold the wound portion of the film. A cam mounted on the casing operates these arms to raise them successively from contact with the film as each respective arm passes the roller and the incoming portion of the film. After the film has been wound a special reel is inserted upon which the film is transferred and reshown.

In use the guide is positioned vertically to receive the film which comes from the machine in vertical position; the casing is accordingly disposed at an angle.

In the drawing:

Fig. 1 is a vertical section through the present invention, showing all of the parts in operative position and with a large portion of the film wound up in the reel.

Figs. 2 to 6 collectively represent an exploded view of the structure shown in Fig. 1.

Fig. 2 shows a vertical section of the door and slide.

Fig. 3 is a vertical section of the reel for internal winding of the film.

Fig. 4 is a vertical section of the carrier.

Fig. 5 is a vertical section of the casing.

Fig. 6 shows an edge view of the pulley.

Fig. 7 is largely a section through the roller, showing the construction thereof.

Fig. 8 is a rear view of the casing taken from the line 8—8 of Fig. 5.

Fig. 9 is an elevation of the pulley, taken in the direction of arrow 9, Fig. 6.

Fig. 10 is a rear view of the carrier, taken from the line 10—10 of Fig. 4.

Fig. 11 is a detail, indicating the means for tensioning the pressure arm carrying means.

Fig. 12 is a front view of the reel taken from line 12—12 Fig. 3.

Fig. 13 is an elevation partially in section taken on line 13—13 in Fig. 12.

Fig. 14 is a front view of the door and slide looking in the direction of the arrow 14 Fig. 1.

Fig. 15 is a face view of the special reel onto which the film is transferred from the internal reel.

Fig. 16 is a central cross section through Fig. 15.

The casing is composed of the back plate 20, the annular outer rim 21, and a door 22, hinged to the casing at 23 (Fig. 14).

The casing is mounted by any suitable means in a stationary position at an angle of about thirty degrees to the incoming film, as indicated in Fig. 1. The back plate 20 of the casing is provided with a boss 24, in which a driven shaft 25, carrying pulley 26, is journalled. The pulley is provided with a ratchet 27, adapted to be engaged by a counterweighted dog 28, mounted on a portion 29 of the boss 24 (Fig. 8). The portion 29 carries a stop 30 to engage the dog and thus prevent movement of the pulley in a reverse direction. The shaft 25 is fixed in a boss 31 of the plate 32 of the carrier 33, the boss 31 bearing upon the internal portion of the boss 24 of the casing back 20. The plate 32 is provided with a series of radial slots 34 to receive the arms carrying the pressure pads, as hereinafter described. The plate 32 also carries forwardly projecting pins 35 to engage in holes 36 in the plate 37 of the reel. The reel also has an annular rim 38 mounted thereon and the plate 37 is provided with radial slots 39 to cooperate with the radial slots 34 of the carrier. A sleeve 40, to receive the forward end of shaft 25 is fixed in the plate 37 of the reel as by expanding, as shown, the sleeve projecting forwardly slightly beyond the rim 38, where it is provided with an annular flange 41 for a purpose hereinafter described. The annular rim 38 is formed of two parts hinged together at 45 and the pintle 46 projects into a slot 47 in the plate 37, the pintle being slidable in the slot. At the middle point of each part of the rim 38, a pin 48 is provided, these pins projecting into and being slidable in the slots 49 in the plate 37. When in operative position, the parts of the rim 38 abut at 50 and the adjacent rim extremities are equipped with fingers 51 pivoted to said extremities at 52, the outer portions of the fingers being connected by a tension spring 53, detachable from one of said fingers. The other ends of the fingers are curved and project into the inclined openings 54 in the plate 37, as shown. It is obvious that the tension of the spring 53 will tend to cause the ends of the fingers to enter farther into the inclined openings 54, thereby drawing the rim 38 against the plate 37 and also causing a tighter joint 50.

The door 22 is provided with a slide 60 retained against lateral movement by guides 61. The door is provided with a large opening 62 and the slide with a smaller opening 63. A bracket 64 is positioned over the opening 63 and carries a bent spindle 65 for a roller 66, which has a soft cover 166, (Fig. 7) such as fabric. A guide 67 for the incoming portion of the film is mounted on the slide and is braced by means of arm 68. The opening 63 in the slide 60 accommodates the upper outer portion of the angularly disposed roller 66, and the elongated opening 62 in the door 22 accommodates said roller in its different positions as it moves with the slide.

In order to keep the roller 66 in contact with the film, a light tension spring 70 is connected at one end with an arm 69, secured to the slide 60, and at the other end to the door 22. This spring, however, permits the roller and slide to rise as the film builds up within the reel 37, 38. The slide is equipped with ratchet teeth 74 to receive a dog 71 under the pressure of a spring 72 retained by a stop 73, the last mentioned parts being mounted on the adjacent guide 61. By this means the slide is positively held as it rises on the door 22.

As before indicated, the slots 34 in the carrier and the slots 39 in the reel receive arms 80, carrying at their free extremities pressure pads 81, adapted to engage the film portion, which has been positioned internally in the reel.

Each of the arms 80 is pivoted on a freely slidable plate 82, as indicated at 83, and to the short portion of each arm 80 there is pivoted at 84 a second arm 85, the outer end of which carries a small roller 86, which reciprocates in a guide slot 87 in the plate 82. By means of the pivot 83 the arms 80 and 85 and the plate 82 are also slidably mounted on a bar 88 by means of a longitudinally extending slot 89 therein. One of these bars 88 is mounted on the back 32 of the carrier at one side of each of the slots 34.

On the inner face of the back casing plate 20, and directly opposite the roller 66, a radially extending cam 90 is provided upon which the rollers 86 are adapted to engage to project the arms 85 forwardly and withdraw the arms 80 and pads 81 from the film at the time that the respective arm passes the roller 66 and the incoming portion of the film, which is guided under the roller 66 and pressed into position thereby.

A strong coil spring 91 (Fig. 1) is positioned at each pivot 83 to urge the respective arm 80 and pad 81 against the film. In order to properly tension each arm 80 as it engages the film, each plate 82 is connected with a spring device 92 by means of a strap 93. This tends to draw the respective plate 82 and its arm 80 outwardly toward the periphery of the device. However, the power of the spring 91 exceeds that of the spring 92, so that each plate 82 will move inwardly on its bar 88 as the film builds up in the internal reel 37, 38. In order to retain this position so that plate 82 and arm 80 will not be drawn back toward the periphery when the cam 90 elevates the arm 80, a ratchet bar 96 is positioned at each slot 34 on the side opposite from the bar 88, this ratchet being engaged by a dog 94, mounted on a pin 95, extending through the respective plate 82, the pin also carrying a finger 97. In order to release the dogs 94, as is necessary after the wound film has been removed and a new one started, a bar 98 provided at its opposite ends with diagonal slots 99, is positioned on pins 100 in the ratchet bar 96, said pins projecting through said slots 99. At the top of each bar 98 a pin 101 is positioned, this being engaged by one end of a lever 102, the opposite end of which extends under an annular flange 103 on an annular ring 104, mounted upon the carrier rim 33. The flange 103 is provided adjacent each lever 102 with an inwardly projecting cam 105. A rotation of the ring 104 causes each cam 105 to engage the respective lever 102, which lifts the respective bar 98, which is projected rearwardly by means of the diagonal slots 99 bearing on the pins 100. When a bar 98 is thus projected rearwardly, it engages the adjacent finger 97 and throws the dog 94 out of engagement with the ratchet teeth 96, whereupon the spring 92 returns the plate 82 to its circumferential position. Since all of the cams 105 are operated simultaneously, all of the plates 82 will be restored to position simultaneously.

When the film has been entirely wound within the reel 37, 38, the door 22 is opened withdrawing the roller 66 from its position, and a reel member comprising a plate 110 having laterally projecting pins 112 is introduced so that the pins 112 pass between the arms 80, these pins being provided in a number equal to that of the arms 80. This device is illustrated in Figs. 15 and 16. As introduced, the plate 37 of Fig. 16 and the sleeve 40 are removed, the pins 112 thus being supported on the plate 110 only. The plate 110 is provided with a plurality of radial slots 111, through which a reduced portion of each pin 112 extends. Each pin 112 also extends through a curved slot 113, in a smaller rotary plate 114, and is retained by means of a head 115. It will be seen that rotation of the plate 114 will, by means of the curved slots 113, cause the pins 112 to be moved either inwardly or outwardly in the slots 111, as desired. Thus, after the pins 112 are positioned within the wound film in the reel 37—38, the plate 114 is rotated to cause the pins 112 to engage the film firmly.

A key 116, pivoted on the plate 114 at 117 is then swung into position behind the annular flange 41 on the sleeve 40 of the reel member 37. This locks the film in position between the plates 37 and 110, and between the pins 112 and the two-part rim 38. These parts are then withdrawn from the shaft 25 and the positioning pins 35.

It is now necessary to remove the rim 38. This is done by disconnecting the spring 53 from one of the fingers 51, withdrawing said fingers from the holes 54 in the plate 37, separating the parts 38 so that the pins 48 will ride out through the slots 49, and then moving the pintle 46 out through the slot 47. This leaves the parts 37 and 110 in the relation shown in Fig. 16, with the exception that the film is omitted in the drawing for the sake of clearness.

The two-part rim member 38 is then mounted upon another plate 37, carrying a sleeve 40, and replaced in the machine. The machine is then ready to receive the same film again, or another film, while the film which has just been removed is ready to be replaced in a motion picture projecting machine with its beginning outermost on the reel 30.

An opening 122 is provided in the door 22 to secure the end of the film to the reel before winding begins.

It will be seen that by inclining the casing 20, 21, 22, to about thirty degrees to the direction of the incoming film, as shown in Fig. 1, the film will enter the film guide 67 and pass under the roller 66 without cracking or undue bending and will be packed neatly within the reel and be held there by the pads 81.

From the foregoing, it is believed that the construction and operation of the present invention will be clear to those skilled in the art.

I claim:

1. In combination a reel and a carrier therefor, and tension devices mounted on said structure and normally engaging the film as it builds up in the reel and yielding bodily inwardly during the film winding operation, and means acting on the said devices to cause them to release the film at predetermined intervals.

2. In combination a reel and a carrier therefor, and tension devices mounted on said structure and normally engaging the film, and means acting on the said devices to cause them to release the film at predetermined intervals.

3. In combination, a reel and a carrier therefor, and tension devices mounted on said structure and normally engaging the film as it builds up in the reel and yielding bodily inwardly during the film winding operation, and means acting on said devices to cause them to successively release the film during each revolution of the rotary structure.

4. In combination, a reel and a carrier therefor, and tension devices mounted on said structure and normally engaging the film as it builds up in the reel and yielding bodily inwardly during the film winding operation, and means acting on said devices to cause them to successively move away from the convoluted portion of the film as they approach the incoming film ribbon.

5. In combination, a reel and a carrier therefor, and tension devices mounted on said structure and normally engaging the film as it builds up in the reel, and means acting on said devices to cause them to successively move away from the convoluted portion of the film as they approach the incoming film ribbon.

6. A rotary reel carrier having tension devices inwardly yielding bodily as the thickness of the convoluted film increases, said devices being also under independent tension to cause them to normally engage the film as it builds inwardly toward the center of the reel.

7. A rotary reel carrier having tension devices inwardly yielding bodily as the thickness of the convoluted film increases, said devices being also under independent tension to cause them to normally engage the film as it builds inwardly toward the center of the reel, and means to cause said devices to move successively away from the convoluted portion of the film as they approach the incoming ribbon thereof.

8. In combination, a rotory carrier, a reel connected to rotate therewith, film engaging tension devices fulcrumed on the carrier, and means acting on the tension devices to cause them to move away from the film at predetermined intervals.

9. In combination, a rotary carrier, a reel connected to rotate therewith, and tension devices mounted on the carrier and movable inwardly bodily thereon as the convolutions of the film multiply in the reel, said tension devices being fulcrumed on the carrier, and means acting on said devices to cause them to move on their fulcrums at predetermined intervals.

10. A rotary reel carrier including fulcrumed film engaging tension devices movable on their fulcrums as occasion may require, and also movable bodily on the carrier during the building of the film upon the reel.

11. A non-rewind reel for motion picture films, comprising a stationary support, a rotary reel carrier mounted on the support, a reel for internal winding of a film mounted to rotate with the carrier, a plurality of movable devices for engaging the portion of the film wound upon the reel and means on the support to be engaged by said devices to lift the same successively as they pass the incoming portion of the film.

12. A non-rewind reel for motion picture films, comprising a stationary support, a rotary reel carrier mounted on the support, a reel for internal winding of a film mounted to rotate with the carrier, and a plurality of movable devices for engaging the portion of the film wound upon the reel, said support carrying a cam adapted to be engaged by said devices to lift the same successively as they pass the incoming portion of the film.

13. A non-rewind reel for motion picture films, comprising a stationary support, a carrier mounted to rotate in said support, a reel for internal winding of a film therein mounted to rotate with said carrier, means to guide a film into said reel, movable devices for engaging the wound portion of the film, and means located to successively move said devices to lift the same from the film as said devices pass the incoming portion of the film.

14. A non-rewind reel for motion picture films, comprising a stationary support, a carrier mounted to rotate in said support, a reel for internal winding of a film therein mounted to rotate with said carrier, means to guide a film into said reel, movable devices for engaging the wound portion of the film, and means located to successively move said devices to lift the same from the film as said devices pass the incoming portion of the film, said movable devices being spring controlled to engage the film with an efficient amount of pressure.

15. A non-rewind reel for motion picture films, comprising a stationary support, a carrier mounted to rotate in said support, a reel for internal winding of a film therein mounted to rotate with said carrier, means to guide a film into said reel, movable devices for engaging the wound portion of the film, means located to successively move said devices to lift the same from the film as said devices pass the incoming portion of the film, said movable devices being spring-controlled to engage the film with an efficient amount of pressure, and movable spring-controlled plates upon which said devices are mounted, said plates being yieldable to move inwardly as the film builds up within the reel.

16. A non-rewind reel for motion picture films, comprising a stationary support, a carrier mounted to rotate in said support, a reel for internal winding of a film therein mounted to rotate with said carrier, means to guide a film into said reel, movable devices for engaging the wound portion of the film, means located to successively move said devices to lift the same from the film as said devices pass the incoming portion of the film, said movable devices being spring-controlled to engage the film with an efficient amount of pressure, movable spring-controlled plates upon which said devices are mounted, said plates being yieldable to move inwardly as the film builds up within the reel, and means to hold said plates at each stage of inward movement.

17. A non-rewind reel for motion picture films, comprising a stationary support, a carrier mounted to rotate in said support, a reel for internal winding of a film therein mounted to rotate with said carrier, means to guide a film into said reel, movable devices for engaging the wound portion of the film, and means located opposite said guiding means and the incoming portion of the film to successively move said devices to lift the same from the film as said devices pass the incoming portion of the film.

18. A non-rewind reel for motion picture films, comprising a stationary support, a rotary reel carrier mounted on the support, a reel for internal winding of a film mounted to rotate with the carrier, means for positioning the incoming portion of the film as it enters the reel, a plurality of devices movable with the reel for engaging and retaining that portion of the film which has been wound within the reel, said devices being also independently movable, and means located opposite said positioning means and mounted on said support for successively operating said positioning devices to move them from the film as the respective devices pass the incoming portion of the film.

19. A non-rewind reel for motion picture films, comprising a stationary support, a rotary reel carrier mounted on the support, a reel for internal winding of a film mounted to rotate with the carrier, the reel comprising a back having slots, and a plurality of arms mounted on the carrier and extending through the slots in the reel, said arms being adapted to engage the wound portion of the film.

20. A non-rewind reel for motion picture films, comprising a stationary support, a rotary reel carrier mounted on the support, a reel for internal winding of a film mounted to rotate with the carrier, the reel comprising a back having slots, a plurality of arms mounted on the carrier and extending through the slots in the reel, said arms beinb adapted to engage the wound portion of the film, and a plurality of plates slidable upon the carrier upon which said arms are mounted.

21. A non-rewind reel for motion picture films, comprising a stationary support, a rotary reel carrier mounted on the support, a reel for internal winding of a film mounted to rotate with the carrier, the reel comprising a back having slots, a plurality of arms mounted on the carrier and extending through the slots in the reel, said arms being adapted to engage the wound portion of the film, and a plurality of plates slidable upon the carrier upon which said arms are mounted, said plates being under tension to tend to urge them outwardly but yieldable to move inwardly.

22. A non-rewind reel for motion picture films, comprising a stationary support, a rotary reel carrier mounted on the support, a reel for internal winding of a film mounted to rotate with the carrier, the reel comprising a back having slots, a plurality of arms mounted on the carrier and extending through the slots in the reel, said arms being adapted to engage the wound portion of the film, a plurality of plates slidable upon the carrier upon which said arms are mounted, said plates being under tension to tend to urge them outwardly but yieldable to move inwardly, and means to hold said plates at each stage of inward movement.

23. A non-rewind reel for motion picture films, comprising a stationary support, a rotary reel carrier mounted on the support, a reel for internal winding of a film mounted to rotate with the carrier, the reel comprising a back having slots, a plurality of arms mounted on the carrier and extending through the slots in the reel, said arms being adapted to engage the wound portion of the film, a plurality of plates slidable upon the carrier upon which said arms are mounted, said plates being under tension to tend to urge them outwardly but yieldable to move inwardly, means to hold said plates at each stage of inward movement, and means to release said plates.

24. A non-rewind reel for motion picture films, comprising a stationary support, a rotary reel carrier mounted on the support, a reel for internal winding of a film mounted to rotate with the carrier, the reel comprising a back having slots, a plurality of arms mounted on the carrier and extending through the slots in the reel, said arms being adapted to engage the wound portion of the film, a plurality of plates slidable upon the carrier upon which said arms are mounted, said plates being under tension to tend to urge them outwardly but yieldable to move inwardly, means to hold said plates at each stage of inward movement, means to release said plates, said means comprising movable members connected with said plates, and a ring movable annularly on said carrier and having cam portions to engage and move said members to release the plates.

25. A non-rewind reel for motion picture films, for internal winding of a film comprising a back plate and an annular rim removably mounted thereon, the rim comprising a plurality of hinged parts and pins projecting into short slots extending inward from the edge of the back plate.

26. A non-rewind reel for motion picture films, for internal winding of a film comprising a back plate and an annular rim removably mounted thereon, an auxiliary reel plate, a plurality of film-engaging pins fixed in and movable outwardly on said auxiliary plate, and means to removably secure said auxiliary plate to said back plate.

27. In a non-rewind reel mechanism for motion picture films, a reel for internal winding of a film therein comprising a back plate, an axial member having one end secured to the plate at its center of rotation, an auxiliary plate adapted to fit on the other end of said axial member, means to removably secure said auxiliary plate to said axial member, and a plurality of film-engaging pins fixed in and movable outwardly on said auxiliary plate and adapted to extend between said plate and receive the film therearound.

28. In a non-rewind reel mechanism for motion picture films, a reel for internal winding of a film therein, comprising a back plate, a tubular shaft secured to said plate at one end, an annular flange on the other end, and an auxiliary plate adapted to fit on said tubular shaft, means on said auxiliary plate to engage said flange to secure said auxiliary plate to said shaft, a third plate on said auxiliary plate, pins mounted in said auxiliary and third plates and movable by said third plate outwardly on said auxiliary plate, said pins being adapted to extend between the back plate and the auxiliary plate and to receive a roll of film therearound.

29. In a non-rewind attachment for moving picture machines, a support, a member rotatably mounted thereon, a flange projecting at right angles to the surface of said rotatable member and near the outer periphery thereof, said flange being adapted to receive a film, a plurality of separate means cooperating with said flange for holding a film firmly thereagainst and means for releasing each of said holding means once every revolution of the rotary member.

30. In a non-rewind attachment for moving picture machines, a support, a member rotatably mounted thereon, a flange projecting substantially at right angles to the surface of said rotatable member and near the outer periphery thereof, said flange being adapted to receive a film, a plurality of separate means movably attached to said rotatable member for holding the film firmly against said flange and means for releasing each of said holding means from contact with the film once each revolution.

In testimony whereof I affix my signature.

HARRY M. STEPHENSON.